(12) United States Patent
Yu

(10) Patent No.: US 11,870,090 B2
(45) Date of Patent: Jan. 9, 2024

(54) BATTERY MODULE, BATTERY AND ASSEMBLING METHOD AND DEVICE THEREOF, AND ELECTRICAL APPARATUS

(71) Applicant: CONTEMPORARY AMPEREX TECHNOLOGY CO., LIMITED, Ningde (CN)

(72) Inventor: Xin Yu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/183,543

(22) Filed: Mar. 14, 2023

(65) Prior Publication Data

US 2023/0216128 A1    Jul. 6, 2023

Related U.S. Application Data

(63) Continuation of application No. PCT/CN2021/115345, filed on Aug. 30, 2021.

(51) Int. Cl.
*H01M 50/258* (2021.01)
*H01M 50/204* (2021.01)

(52) U.S. Cl.
CPC ....... *H01M 50/258* (2021.01); *H01M 50/204* (2021.01)

(58) Field of Classification Search
CPC .................................................. H01M 50/204
See application file for complete search history.

(56) References Cited

U.S. PATENT DOCUMENTS

| 2011/0217587 A1* | 9/2011 | An | H01M 50/209 |
| | | | 429/156 |
| 2018/0013106 A1* | 1/2018 | Kano | H01M 50/242 |

FOREIGN PATENT DOCUMENTS

| CN | 206076355 U | 4/2017 |
| CN | 211719648 U | 10/2020 |
| CN | 113258218 A | 8/2021 |

(Continued)

OTHER PUBLICATIONS

The World Intellectual Property Organization (WIPO) International Search Report and Written Opinion for PCT/CN2021/115345 dated May 12, 2022 12 pages (including translation).

*Primary Examiner* — Maria Laios
*Assistant Examiner* — Jordan E Berresford
(74) *Attorney, Agent, or Firm* — ANOVA LAW GROUP, PLLC

(57) ABSTRACT

A battery module includes a plurality of battery units arranged in a first direction and each including a plurality of battery cells arranged in a second direction perpendicular to the first direction, and two holders respectively located at two ends of the plurality of battery units in a third direction perpendicular to the second direction and the first direction. Each of the holders includes a main body portion. A plurality of guide portions are provided on a side of the main body portion close to the plurality of battery units, and are arranged corresponding to the plurality of battery units. The guide portions extend toward the plurality of battery units in the third direction, and are configured to provide guidance for movement of the corresponding battery cells. Extension lengths of the plurality of guide portions gradually decrease in the first direction.

20 Claims, 11 Drawing Sheets

(56) References Cited

FOREIGN PATENT DOCUMENTS

| JP | 2017079184 A | * | 4/2017 | |
|----|--------------|---|--------|---|
| JP | 2019079682 A | | 5/2019 | |
| KR | 20190054897 A | * | 11/2017 | .......... H01M 10/643 |

* cited by examiner

BATTERY MODULE, BATTERY AND ASSEMBLING METHOD AND DEVICE THEREOF, AND ELECTRICAL APPARATUS

CROSS-REFERENCE TO RELATED APPLICATION

This application is a continuation of International Application No. PCT/CN2021/115345, filed on Aug. 30, 2021, the entire content of which is incorporated herein by reference.

TECHNICAL FIELD

The present application relates to the technical field of batteries, and particularly to a battery module, a battery and an assembling method and device thereof, and an electrical apparatus.

BACKGROUND ART

Due to the advantages such as high energy density, high power density, many cycles of use, and long storage time, batteries such as lithium-ion batteries are widely used in various devices.

In the development of the battery technology, in addition to improving the performance of batteries, the assembly problem is also a problem that cannot be ignored.

SUMMARY OF THE INVENTION

An objective of the present application is to reduce the difficulty of assembling a battery.

According to a first aspect of the present application, provided is a battery module, including:

a plurality of battery units configured to be stacked in a first direction, each battery unit including a plurality of battery cells arranged in a second direction, the second direction being perpendicular to the first direction; and two holders respectively located at two ends of the plurality of battery units in a third direction, the third direction being perpendicular to the second direction and the first direction, wherein each of the holders includes a main body portion, and a plurality of guide portions are provided on the side of the main body portion close to the plurality of battery units; the plurality of guide portions are arranged corresponding to the plurality of battery units on a one-to-one basis; the guide portions extend toward the plurality of battery units in the third direction, and each of the guide portions is configured to provide guidance for the movement of the corresponding battery unit; and wherein the plurality of guide portions have extension lengths gradually decreasing in the first direction.

In this embodiment of the present application, by providing, on the holder, a plurality of guide portions having extension lengths gradually decreasing in the first direction, the layered mounting of the plurality of battery units can be realized, and there is no need to align all the battery cells of the plurality of battery units with the mounting positions on the holder at the same time, so that even if the number of battery cells is large, the battery cells can be easily mounted, the influence, caused by the accumulation of tolerances of parts and the play of the battery cells, on the assembly can be reduced, and therefore the difficulty of assembling the battery module can be reduced, thereby improving the assembly efficiency.

In some embodiments, the surface of the guide portion that is configured to provide guidance for the movement of the battery unit is adapted to the shape of the battery cells.

In this embodiment of the present application, the contact area between the guide portion and the battery cells can be increased. During the layered mounting of the battery units, when a battery unit is placed on the guide portion, the guide portion can partially surround circumferential surfaces of the plurality of battery cells of the corresponding battery unit. When the two holders are brought close to each other to move the battery unit relative to the guide portion, the guide portion can also provide a better guiding effect on the battery unit, so that the movement of the battery unit is more stable, and the assembly process of the battery module is therefore smoother, thereby improving the assembly efficiency. In addition, during the use of the battery module, the battery cells can also be reliably maintained at the mounting positions by means of the guide portion, thereby preventing positional displacement under the action of vibration and impact.

In some embodiments, the guide portion is provided with grooves in which the battery cells are accommodated.

In this embodiment of the present application, the battery cells are accommodated in the grooves of the guide portion. During the layered mounting of the battery units, when the battery cells are placed in the grooves, the battery cells can be restrained from moving in the second direction, so that the battery cells are stably placed on the guide portion. When the two holders are brought close to each other to move the battery cells relative to the guide portion, the grooves can also provide a better guiding effect on the battery cells, so that the movement of the battery cells is more stable, and the assembly process of the battery module is therefore smoother, thereby improving the assembly efficiency. In addition, during the use of the battery module, the battery cells can also be reliably maintained at the mounting positions by means of the grooves, thereby preventing positional displacement under the action of vibration and impact.

In some embodiments, the guide portion is configured to provide support for the corresponding battery unit.

In this embodiment of the present application, during the layered mounting of the battery units, when a battery unit is placed on the guide portion, the guide portion can provide a good support for the corresponding battery unit. When the two holders are brought close to each other to move the battery unit relative to the guide portion, the guide portion can also provide a better guiding effect on the battery unit, so that the movement of the battery unit is more stable, and the assembly process of the battery module is therefore smoother, thereby improving the assembly efficiency. In addition, during the use of the battery module, the battery cells can also be reliably maintained at the mounting positions by means of the guide portion, thereby preventing positional displacement under the action of vibration and impact.

In some embodiments, the one of the plurality of guide portions having the longest extension length is defined as a first guide portion; and each guide portion, except the first guide portion, is arranged between two adjacent battery units, and the guide portion is in contact with one of the two adjacent battery units and has a gap with the other of the two adjacent battery units.

In this embodiment of the present application, during assembly, after the battery unit is placed on the corresponding guide portion, when the two holders are brought close to each other, it can be ensured that the battery cells are smoothly moved under the guidance of the guide portion to prevent jamming, the assembly difficulty can be reduced, thereby improving the assembly efficiency. Moreover, outer surfaces of the battery cells can be prevented from being scratched by the guide portion during assembly, thereby improving the assembly quality of the battery module.

In some embodiments, each guide portion includes a plurality of guide structures, the plurality of guide structures being arranged corresponding to the plurality of corresponding battery cells on a one-to-one basis.

In this embodiment of the present application, a plurality of guide structures are provided for each guide portion, and the plurality of guide structures can respectively provide a guiding effect to the plurality of corresponding battery cells, so that the plurality of battery cells of each battery unit can be each independently and stably guided to prevent mutual interference between adjacent battery cells, thereby reducing the difficulty of assembling the battery module.

In some embodiments, adjacent guide structures of the same guide portion are connected to each other.

In this embodiment of the present application, the adjacent guide structures of the same guide portion are connected to each other, so that the overall rigidity of the guide portion and the overall rigidity of the holder can be increased, so as to prevent the deformation of the guide portion during the storage and transfer of the holder, ensuring the smooth assembly of the battery cells. Moreover, during the long-term use of the battery module, the deformation of the guide portion due to vibration or impact can also be prevented, so as to ensure that the guide portion provides a stable support for the battery unit, and to improve the reliability and the service life of the battery module.

In some embodiments, the battery module further includes a thermal management component arranged between two adjacent battery units, the one of the plurality of guide portions having the longest extension length is defined as a first guide portion; and the guide structures of each guide portion, except the first guide portion, are provided with notches, the notches being configured to be clear of the thermal management component.

In this embodiment of the present application, by providing a notch on each guide structure, the guide structure can be clear of the thermal management component, so as to leave a space for the thermal management component to extend beyond the guide structure in the third direction, thereby providing a better temperature regulation effect for the battery cells, and improving the operation performance of the battery module.

In some embodiments, the holder is provided with a clearance channel corresponding to each guide portion, the clearance channel being configured to allow the battery unit to be mounted to the guide portion in the first direction.

In this embodiment of the present application, by correspondingly providing a clearance channel for each guide portion, the battery unit can be smoothly mounted in the first direction to the position where the corresponding guide portion is located. Moreover, after being mounted in place in the first direction, the battery unit can also be supported by the guide portion, so that the battery unit is in a stable placement state, facilitating the subsequent mounting of the next battery unit by bringing the two holders close to each other.

In some embodiments, a plurality of accommodating grooves are provided on the side of the main body portion close to the plurality of battery units, the accommodating grooves are arranged corresponding to the battery cells, and the accommodating grooves are configured to accommodate part of the battery cells.

In this embodiment of the present application, by providing the main body portion with accommodating grooves for accommodating the battery cells so as to position the battery cells in the plane where the second direction and the first direction are located, the battery cells can be brought into a more stable mounted state after the assembly is completed, so that the battery cells are fixed reliably.

In some embodiments, the guide portion is arranged at an end of the accommodating groove in the third direction.

In this embodiment of the present application, the guide structure is arranged at an end of the accommodating groove in the third direction, so that the battery cell can be stably and smoothly enter the accommodating groove through the guiding effect of the guide structure on the battery cell during assembly in the process of bringing the two holders close to each other, so that the layered mounting of the plurality of battery units can be smoothly realized, and the assembly efficiency can be improved.

In some embodiments, a protrusion is formed on an inner wall of the accommodating groove, the protrusion being configured to restrain the movement of the battery cell in the third direction.

In this embodiment of the present application, by providing protrusions on the accommodating grooves of the two holders, the movement of the battery cells in the third direction can be restrained, and the battery cells can be prevented from playing in the third direction due to vibration and impact during operation, so that the battery cells are mounted more reliably.

In some embodiments, the holder is provided with a plurality of injection holes on an outer side in the third direction, the injection holes being configured to form channels for injecting an adhesive, and each of the accommodating grooves is in communication with at least some of the injection holes.

In this embodiment of the present application, injection holes are provided on an outer side of the holder, and an adhesive layer can be injected after the mounting of some of the battery units is completed, or after the mounting of all the battery units is completed, so that the adhesive layer is filled in between inner surfaces of the accommodating grooves and outer surfaces of the battery cells, and the battery cells can be reliably fixed in the accommodating grooves.

In some embodiments, the battery module further includes a thermal management component arranged between two adjacent battery units, wherein an end of the thermal management component in the third direction abuts against the adjacent guide portion in the first direction, to restrain the thermal management component and the battery cell adjacent to the thermal management component from being disengaged outwardly in the first direction by means of the guide portion.

In this embodiment of the present application, the guide portion restrains the thermal management component and the battery cells adjacent to the thermal management component from being disengaged outwardly in the first direction, so as to limit the freedom of the thermal management component and the adjacent battery unit in the first direction, so that not only can the thermal management component and the battery unit that have been mounted be prevented from shaking during assembly, but also the overall rigidity of the battery module can be increased. The thermal management component and the battery unit are prevented from shaking under the action of vibration and impact during the use of the battery module.

According to a second aspect of the present application, provided is a battery, including the battery module according to the above embodiments.

According to a third aspect of the present application, provided is an electrical apparatus, including the battery according to the above embodiment, the battery being configured to supply electric energy.

According to a fourth aspect of the present application, provided is a method for assembling a battery module, the method including:

- arranging two holders at an interval in a third direction;
- mounting a first battery unit, wherein the battery unit includes a plurality of battery cells arranged in a second direction, each of the holders includes a main body portion, the side of the main body portion close to the battery unit is provided with a plurality of guide portions, the guide portions extend toward the battery unit in the third direction, the plurality of guide portions have extension lengths gradually decreasing in a first direction, a first guide portion has an extension length greater than those of the other guide portions, and the first battery unit is mounted on the first guide portion;
- bringing the two holders close to each other in the third direction until the distance between second guide portions of the two holders is smaller than the dimension of the battery cell in the third direction; and
- mounting a second battery unit from top to bottom.

In this embodiment of the present application, the layered mounting of the plurality of battery units can be realized, and there is no need to align all the battery cells of the plurality of battery units with the mounting positions on the holder at the same time, so that even if the number of battery cells is large, the battery cells can be easily mounted, the influence, caused by the tolerances of parts, on the assembly of the battery cells can be reduced, and therefore the difficulty of assembling the battery module can be reduced, thereby improving the assembly efficiency.

In some embodiments, the assembling method further includes:

- after the first battery unit is mounted, mounting a thermal management component coated with an adhesive on an upper surface of the first battery unit such that the thermal management component is fixed to the first battery unit.

In this embodiment of the present application, by fixing a thermal management component on the mounted battery unit, not only can the mounted battery unit be fixed during assembly to facilitate the mounting of a subsequent battery unit, but also the position of the battery unit can be maintained during the use of the battery module, the anti-vibration and impact ability is enhanced, and thermal regulation is provided for the adjacent battery unit, so that the performance of the battery module remains stable.

In some embodiments, a plurality of accommodating grooves are provided on the side of the main body portion close to the battery unit, the accommodating grooves are arranged corresponding to the battery cells, and the accommodating grooves are configured to accommodate the battery cells; and the assembling method further includes:

- injecting an adhesive from injection holes on an outer side of the holder to form an adhesive layer between the battery cells and the accommodating grooves.

In this embodiment of the present application, an adhesive layer is injected after the mounting of some of the battery units is completed, or after the mounting of all the battery units is completed, so that the adhesive layer is filled in between inner surfaces of the accommodating grooves and outer surfaces of the battery cells, and the battery cells can be reliably fixed in the accommodating grooves.

According to a fifth aspect of the present application, provided is a device for assembling a battery module, the device including:

- a holder placement mechanism configured to arrange two holders at an interval in a third direction;
- a battery mounting mechanism configured to mount a first battery unit, wherein the battery unit includes a plurality of battery cells arranged in a second direction, each of the holders includes a main body portion, the side of the main body portion close to the battery unit is provided with a plurality of guide portions, the guide portions extend toward the battery unit in the third direction, the plurality of guide portions have extension lengths gradually decreasing in a first direction, a first guide portion has an extension length greater than those of the other guide portions, and the first battery unit is mounted on the first guide portion; and
- a holder driving mechanism configured to bring the two holders close to each other in the third direction until the distance between second guide portions of the two holders is smaller than the dimension of the battery cell in the third direction,
- wherein the battery mounting mechanism is configured such that when the distance between the second guide portions of the two holders is smaller than the dimension of the battery cell in the third direction, a second battery unit is mounted from top to bottom.

In this embodiment of the present application, the layered mounting of the plurality of battery units can be realized, and there is no need to align all the battery cells of the plurality of battery units with the mounting positions on the holder at the same time, so that even if the number of battery cells is large, the battery cells can be easily mounted, the influence, caused by the tolerances of parts, on the assembly of the battery cells can be reduced, and therefore the difficulty of assembling the battery module can be reduced, thereby improving the assembly efficiency. Moreover, automated assembly can be implemented.

DESCRIPTION OF DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without any creative effort.

Figure 1:
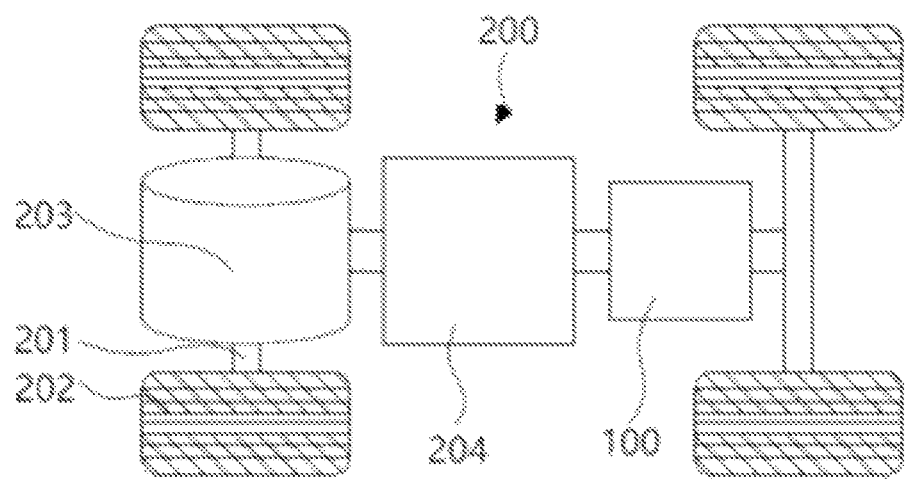
FIG. 1 is a schematic structural diagram of a battery mounted to a vehicle according to some embodiments of the present application.

In the accompanying drawings, the figures are not drawn to scale.

LIST OF REFERENCE SIGNS

100. Battery; 101. Case; 101A. Box body; 101B. Cover body;
200. Vehicle; 201. Axle; 202. Wheel; 203. Motor; 204. Controller;
300. Assembling device; 301. Holder placement mechanism; 302. Battery mounting mechanism; 303. Holder driving mechanism;
10. Battery module;
1. Battery unit; 1'. Battery cell;
2. Holder; 21. main body portion; 211. Accommodating groove; 212. Guide portion; 212'. Guide structure; 212A. Notch; 213. Protrusion; 214. Injection hole; 215. First guide groove; 216. Storage groove; 217. Second guide groove; 22. Connecting portion; 23. Clearance channel;
3. Thermal management component; 31. Positioning post;
x. Second direction; y. Third direction; z. First direction.

DETAILED DESCRIPTION

Implementations of the present application are described in further detail below in conjunction with the drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application.

In addition, the terms "first", "second" and "third" are used for descriptive purposes only, and cannot be construed as indicating or implying relative importance. "Perpendicular" is not strictly perpendicular, but within the allowable range of errors. "Parallel" is not strictly parallel, but within the allowable range of errors. Orientation words appearing in the following description are all directions shown in the drawings, and do not limit the specific structure of the present application.

In the description of the present application, it should also be noted that, unless otherwise expressly specified and limited, the terms "mount," "connected," and "connecting" should be broadly understood, for example, they may be a fixed connection or a detachable connection or be an integrated connection; or may be a direct connection or an indirect connection through an intermediate medium. For those of ordinary skill in the art, the specific meanings of the above terms in the present application may be understood according to specific circumstances.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "plurality of" refers to at least two (including two); similarly, "plurality of groups" refers to at least two (including two) groups, and "plurality of pieces" refers to at least two (including two) pieces.

In order to clearly describe the various orientations in the following embodiments, the various directions are defined below. Taking the coordinate systems of FIGS. 3 and 4 as an example, a first direction z is a stacking direction of a plurality of battery units 1; a second direction x is an arrangement direction of a plurality of battery cells 1' in a single battery unit 1, and a third direction y is perpendicular to the first direction z and the second direction x. On the basis of such orientation definitions, the description of the orientations or positional relationships indicated by the terms "upper", "lower", "top", "bottom", "front", "rear", "inner", "outer", etc. are merely for convenient description of the present application, rather than indicating or implying that an apparatus referred to needs to have a particular orientation or be constructed and operated in a particular orientation, and therefore cannot be construed as limiting the scope of protection of the present application.

The battery cell includes an electrode assembly and an electrolyte solution, and the electrode assembly includes a positive electrode sheet, a negative electrode sheet, and a separator. The operation of the battery cell mainly relies on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive tab. Taking a lithium-ion battery as an example, the positive electrode current collector may be of a material of aluminum, and the positive electrode active material may be lithium cobalt oxide, lithium iron phosphate, ternary lithium or lithium manganate, etc. The negative electrode sheet includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative tab. The negative electrode current collector may be of a material of copper, and the negative electrode active material may be carbon or silicon, etc. In order to ensure that no fusing occurs when a large current passes, there are a plurality of positive tabs which are stacked together, and there are a plurality of negative tabs which are stacked together. The material of the separator may be PP, PE, etc. In addition, the electrode assembly may have a winding structure or a laminated structure, and the embodiments of the present application are not limited thereto.

In the process of battery development, the assembly problem is a problem that cannot be ignored. The assembly difficulty not only affects the production efficiency of the battery, but also affects the assembly quality of the battery and has a negative impact on the battery performance. Over the years, those skilled in the art have tried to solve this problem from many different perspectives, but the expected effect has not been achieved.

In the related art, in order to mount a plurality of battery cells together to form a battery, two holders arranged at an interval are provided. The plurality of battery cells are mounted between the two holders, each holder is provided with a plurality of positioning grooves on the surface facing the battery cells, and two ends of the battery cells are respectively inserted into the positioning grooves of the holders on two sides.

By analyzing the assembly process of the battery in the related art, the inventors have found that the main reasons for the difficulty of assembling the battery at present are as follows: during assembly, it is needed to insert respective first ends of all the battery cells respectively into a plurality of positioning grooves of one of the holders first, then align a plurality of positioning grooves of the other holder with respective second ends of all the battery cells, and then fasten the holder to the second ends of the battery cells. When there is a large number of battery cells, due to the machining error of the positioning grooves of the holders, there is an assembly error between the battery cells and the positioning grooves, and the battery cells are prone to shaking, so that it is difficult to align the positioning grooves of the holder mounted later with the second ends of the battery cells, thereby causing the assembly difficulty.

In order to solve this problem, the inventors try to reduce the assembly difficulty through the following approaches, for example: improving the machining accuracy of the positioning grooves, and improving the matching accuracy between the positioning grooves of the holder mounted first and the battery cells, which, however, will greatly increase the machining difficulty and cost; or increasing the matching gap between the positioning grooves on the holder mounted later and the second ends of the battery cells, which, however, will cause the battery cells to shake after mounting, and result in poor resistance to vibration and impact.

Based on the above considerations, the inventors, after in-depth research, have abandoned the traditional idea of battery assembly, and provided guide portions on the holders to realize the layered assembly of the battery cells, so as to fundamentally solve the problem of reducing the difficulty of assembling the battery and therefore to improve the assembly efficiency.

An electrical apparatus includes a battery for supplying electric energy thereto, and may be, for example, a mobile phone, a portable device, a laptop, an electric motorcycle, an electric vehicle, a ship, a spacecraft, an electric toy, or an electric tool. For example, the spacecraft includes an airplane, a rocket, a space shuttle, or a spaceship. The electric toy includes a fixed or mobile electric toy, such as a game console, an electric vehicle toy, an electric ship toy, and an electric airplane toy. The electric tool includes an electric tool for metal cutting, an electric tool for grinding, an electric tool for assembling and an electric tool for railways, such as an electric drill, an electric grinder, an electric wrench, an electric screwdriver, an electric hammer, an electric impact drill, a concrete vibrator, and an electric planer.

As shown in FIG. 1, the electrical apparatus may be a vehicle 200, for example, a new energy vehicle. The new energy vehicle may be an all-electric vehicle, a hybrid electric vehicle, an extended-range electric vehicle, or the like. Alternatively, the electrical apparatus may be an unmanned aerial vehicle, a ship, or the like. Specifically, the vehicle 200 may include an axle 201, wheels 202 connected to the axle 201, a motor 203, a controller 204, and a battery 100. The motor 203 is configured to drive the axle 201 to rotate, and the controller 204 is configured to control the operation of the motor 203. The battery 100 may be arranged at the bottom, head or tail of the vehicle 200 to supply electric energy for the operation of the motor 103 and other components in the vehicle.

Figure 2:
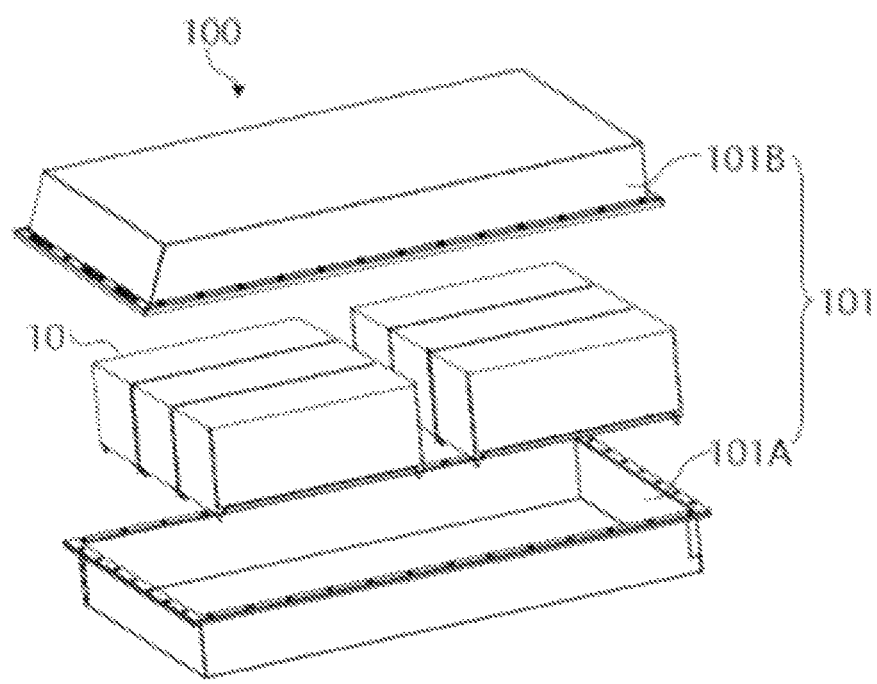
FIG. 2 is a schematic structural diagram of some embodiments of a battery of the present application.

As shown in FIG. 2, the battery 100 includes a case 101 and a battery module 10. The case 101 is configured to provide an accommodating space for the battery module 10, and the battery module 10 is mounted in the case 101.

In the battery 100, the case 101 may include a box body 101A and a cover body 101B which are fastened to each other, and the box body 101A and the cover body 101B jointly define an accommodating space for accommodating the battery module 10. The box body 101A may be of a hollow structure with one side open, the cover body 101B may be a plate-like structure, and the cover body 101B covers the opening side of the box body 101A, so that the cover body 101B and the box body 101A jointly define the accommodating space. The cover body 101B and the box body 101A may be each of a hollow structure with one side open, and the opening side of the cover body 101B covers the opening side of the box body 101A. Of course, the case 101 formed by the cover body 101B and the box body 101A may have various shapes, such as a cylinder or a cuboid. One or a plurality of battery modules 10 may be provided, and the plurality of battery modules 10 may be connected in series, in parallel or in series-parallel connection to achieve a larger capacity or power.

Figure 3:
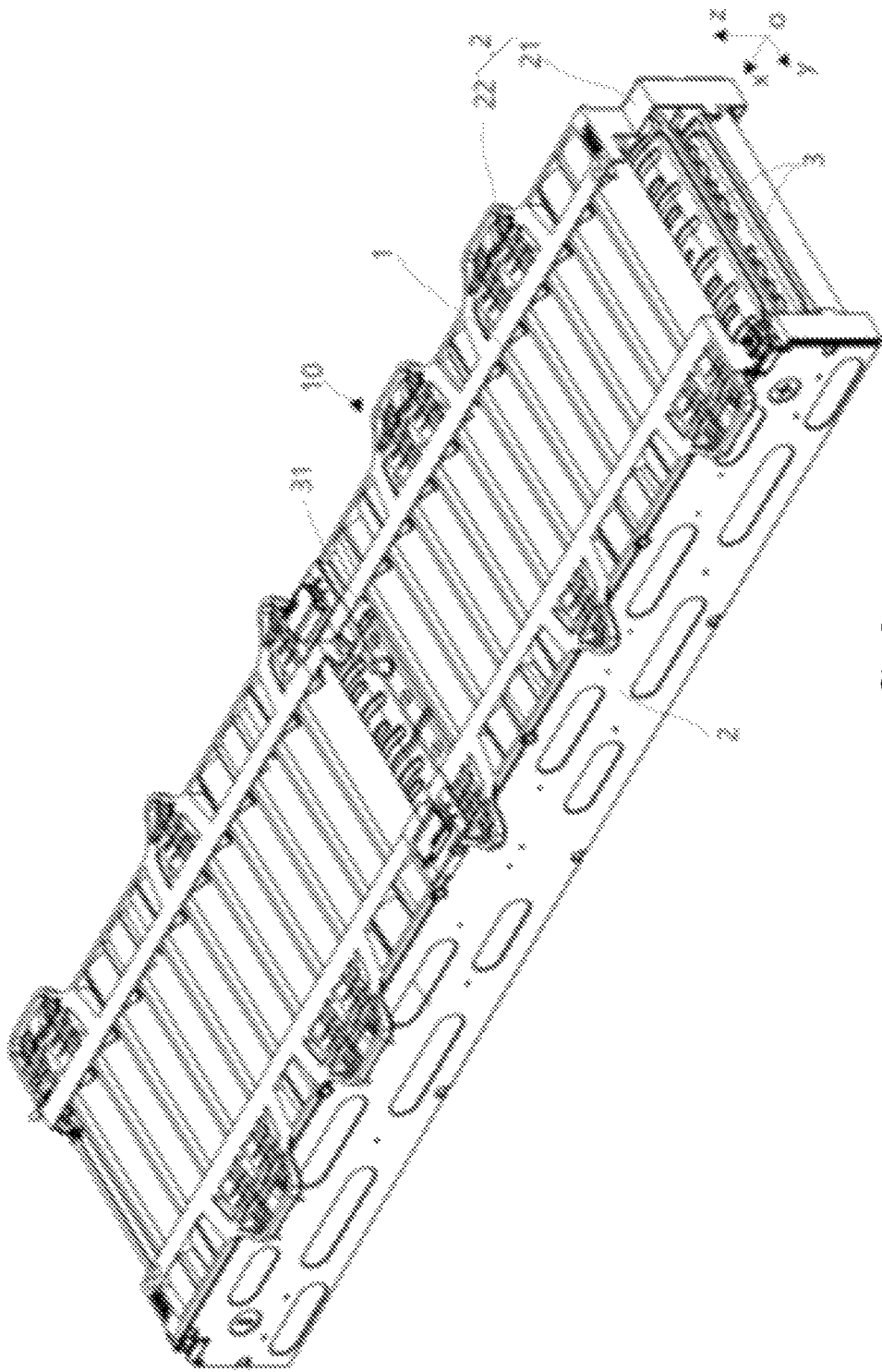
FIG. 3 is a schematic structural diagram of a battery module in some embodiments of a battery of the present application.
Figure 4:
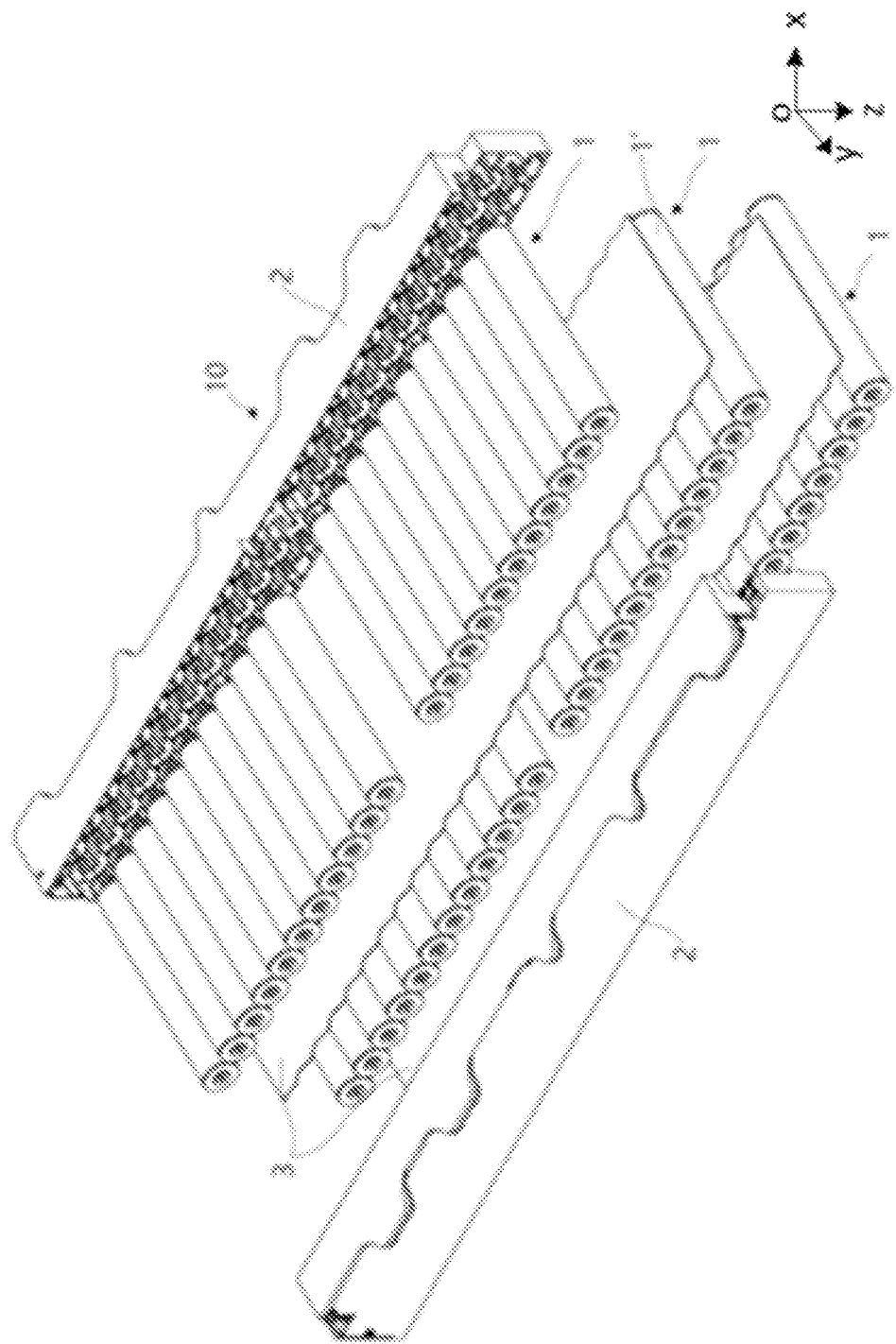
FIG. 4 is a schematic exploded view of a battery module in some embodiments of a battery of the present application.

In some embodiments, as shown in FIGS. 3 and 4, the battery 100 includes a case 101, the battery module 10 is arranged in the case 101, the battery module 10 includes two holders 2 and a plurality of battery units 1, and the two holders 2 are connected to the case 101. Such a structure enables the battery module 10 to be securely mounted in the case 101, for example, when used in a vehicle, to prevent the battery module 10 from playing in the case 101 when the battery 100 is subjected to vibration and impact, thereby improving the use reliability and service life of the battery 100.

As shown in FIG. 3, the holder 2 includes a main body portion 21 and a plurality of connecting portions 22. The plurality of connecting portions 22 are connected to an end of the main body portion 21 in the first direction z and protrude in a direction away from the battery units 1 relative to the main body portion 21 in the third direction y, and the plurality of connecting portions 22 on the same side are arranged at intervals in the second direction x. For example, the connecting portions 22 are detachably connected to the case 101, facilitating the disassembly and maintenance of the battery module 1.

For example, the connecting portions 22 may be arranged at the top end of the main body portion 21 in the first direction z, and a fixed beam for limiting the position of the battery module 10 is provided inside the case 101 on the outer side of the holder 2 in the third direction y. The connecting portions 22 are connected to the fixed beam. Such a structure can prevent the top of the battery module 10 from shaking. Optionally, the connecting portion 22 may be arranged at the bottom end of the main body portion 21 in the first direction z.

Figure 5:
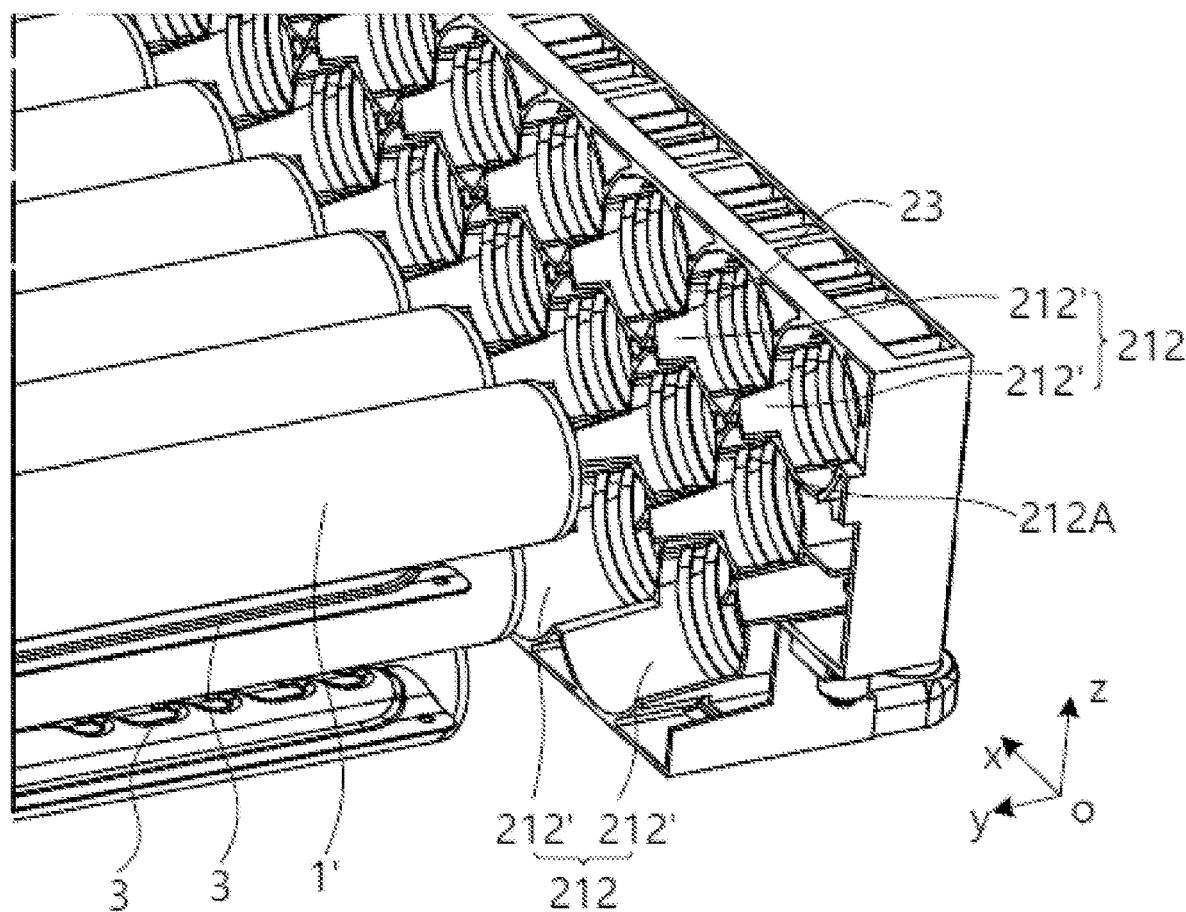
FIG. 5 is a partial schematic diagram of the cooperation between battery cells and a holder in a battery module.

In some embodiments, as shown in FIGS. 3 to 5, the battery module 10 of the present application includes: a plurality of battery units 1 and two holders 2.

The plurality of battery units 1 are configured to be stacked in a first direction z. Each battery unit 1 includes a plurality of battery cells 1' arranged in a second direction x. The second direction x is perpendicular to the first direction z. For example, the battery cells 1' may be square, cylindrical or in other shapes.

The two holders 2 are respectively located at two ends of the plurality of battery units 1 in a third direction y. The third direction y is perpendicular to the second direction x and the first direction z. Each of the holders 2 includes a main body portion 21, and a plurality of guide portions 212 are provided on the side of the main body portion 21 close to the plurality of battery units 1. The plurality of guide portions 212 are arranged corresponding to the plurality of battery units 1 on a one-to-one basis. The guide portions 212 extend toward the plurality of battery units 1 in the third direction y, and each of the guide portions 212 is configured to provide guidance for the movement of the corresponding battery unit 1. The plurality of guide portions 212 have extension lengths gradually decreasing in the first direction z.

As shown in FIGS. 4 and 5, the main body portion 21 of the holder 2 is of a rectangular plate-like structure. The largest side of the rectangular plate-like structure facing the battery unit 1 is provided with the plurality of guide portions 212. The main body portion 21 is provided with a base at the guide portion 212 having the largest extension length, and the base may have an extension length consistent with the guide portion 212 in the third direction y. Optionally, the holder 2 is made of a material with high thermal conductivity, so that the heat generated when the battery cells 1' operate is transferred to the outside through the holder 2, facilitating reducing the temperature of the battery cells 1'. Optionally, the holder 2 is made of an insulating material, so as to realize the insulation between the holder 2 and the battery cells 1', and improve the operation safety of the battery cells 1'.

Taking the state shown in FIG. 5 as an example, from the bottom, the first guide portion 212 has the longest extension length, and the plurality of guide portions 212 have the extension length gradually decreasing from bottom to top.

When mounting the plurality of battery units 1, the two holders 2 are first placed at an interval in the third direction y, the distance between the respective first guide portions 212 of the two holders 2 is smaller than the dimension of the battery cell 1' in the third direction y, and the first battery unit 1 is placed on the first guide portion 212 from top to bottom. The two holders 2 are then brought close to each other in the third direction y until the distance between the respective second guide portions 212 is smaller than the dimension of the battery cell 1' in the third direction y, and the second battery unit 1 is placed on the second guide portion 212 from top to bottom. The third or more battery units 1 are mounted using the same method.

When the two holders 2 are brought close to each other during the above mounting process, the mounted battery unit 1 moves in the third direction y relative to the corresponding guide portion 212, and the guide portion 212 provides guidance for the movement of the battery unit 1.

In this embodiment of the present application, by providing, on the holder 2, a plurality of guide portions 212 having extension lengths gradually decreasing in the first direction z, the layered mounting of the plurality of battery units 1 can be realized, and there is no need to align all the battery cells 1' of the plurality of battery units 1 with the mounting positions on the holder 2 at the same time, so that even if the number of battery cells 1' is large, the battery cells can be easily mounted, the influence, caused by the accumulation of tolerances of parts and the play of the battery cells 1', on the assembly can be reduced, and therefore the difficulty of assembling the battery module 10 can be reduced, thereby improving the assembly efficiency.

In some embodiments, as shown in FIG. 5, the surface of the guide portion 212 that is configured to provide guidance for the movement of the battery unit 1 is adapted to the shape of the battery cells 1'.

By "adapted" is meant that the surface of the guide portion 212 that is configured to provide guidance for the movement of the battery unit 1 has the same form and size as the shape of the battery cells 1'. For example, the battery cells 1' are cylindrical, and the surface of the guide portion 212 for providing guidance is also arc-shaped; or the battery cells 1' are square, and the surface of the guide portion 212 for providing guidance may be in the form of a plane or a right-angle surface.

In this embodiment of the present application, the contact area between the guide portion 212 and the battery cells 1' can be increased. During the layered mounting of the battery units 1, when a battery unit 1 is placed on the guide portion 212, the guide portion 212 can partially surround circumferential surfaces of the plurality of battery cells 1' of the corresponding battery unit 1. When the two holders 2 are brought close to each other to move the battery unit 1 relative to the guide portion 212, the guide portion 212 can also provide a better guiding effect on the battery unit 1, so that the movement of the battery unit 1 is more stable, and the assembly process of the battery module 10 is therefore smoother, thereby improving the assembly efficiency. In addition, during the use of the battery module 10, the battery cells 1' can also be reliably maintained at the mounting positions by means of the guide portion 212, thereby preventing positional displacement under the action of vibration and impact.

In some embodiments, as shown in FIG. 5, the guide portion 212 is provided with grooves in which the battery cells 1' are accommodated. The groove may be configured to extend continuously or intermittently in a circumferential direction of the battery cell 1'.

In this embodiment of the present application, the battery cells 1' are accommodated in the grooves of the guide portion 212. During the layered mounting of the battery units 1, when the battery cells 1' are placed in the grooves, the battery cells 1' can be restrained from moving in the second direction x, so that the battery cells 1' are stably placed on the guide portion 212. When the two holders 2 are brought close to each other to move the battery cells 1' relative to the guide portion 212, the grooves can also provide a better guiding effect on the battery cells 1', so that the movement of the battery cells 1' is more stable, and the assembly process of the battery module 10 is therefore smoother, thereby improving the assembly efficiency. In addition, during the use of the battery module 10, the battery cells 1' can also be reliably maintained at the mounting positions by means of the grooves, thereby preventing positional displacement under the action of vibration and impact.

In some embodiments, the guide portion 212 is configured to provide support for the corresponding battery unit 1.

As shown in FIG. 5, the one of the plurality of guide portions 212 having the longest extension length is defined as a first guide portion 212, and the first guide portion 212 is located at the bottom. If the battery module 10 is in this placement state, each of the guide portions 212 is located at the bottom of the corresponding battery unit 1, and can provide support for the corresponding battery unit 1.

In this embodiment of the present application, during the layered mounting of the battery units 1, when a battery unit 1 is placed on the guide portion 212, the guide portion 212 can provide a good support for the corresponding battery unit 1. When the two holders 2 are brought close to each other to move the battery unit 1 relative to the guide portion 212, the guide portion 212 can also provide a better guiding effect on the battery unit 1, so that the movement of the battery unit 1 is more stable, and the assembly process of the battery module 10 is therefore smoother, thereby improving the assembly efficiency. In addition, during the use of the battery module 10, the battery cells 1' can also be reliably maintained at the mounting positions by means of the guide portion 212, thereby preventing positional displacement under the action of vibration and impact.

In some embodiments, the one of the plurality of guide portions 212 having the longest extension length is defined as a first guide portion 212; and each guide portion 212, except the first guide portion 212, is arranged between two adjacent battery units 1, and the guide portion 212 is in contact with one of the two adjacent battery units 1 and has a gap with the other of the two adjacent battery units 1. The battery unit 1 in contact with the guide portion 212 is the corresponding battery unit 1.

In this embodiment of the present application, during assembly, after the battery unit 1 is placed on the corresponding guide portion 212, when the two holders 2 are brought close to each other, it can be ensured that the battery cells 1' are smoothly moved under the guidance of the guide portion 212 to prevent jamming, the assembly difficulty can be reduced, thereby improving the assembly efficiency. Moreover, outer surfaces of the battery cells 1' can be prevented from being scratched by the guide portion 212 during assembly, thereby improving the assembly quality of the battery module 10.

In some embodiments, as shown in FIG. 5, each guide portion 212 includes a plurality of guide structures 212'. The plurality of guide structures 212' are arranged corresponding to the plurality of corresponding battery cells 1' on a one-to-one basis. Each guide structure 212' is configured to provide guidance for the movement of the corresponding battery cell 1'.

For example, the guide structure 212' may extend from the central plane of the corresponding battery cell 1' toward two sides, the central plane is parallel to the plane formed by the first direction z and the third direction y, and the guide structure 212' is symmetrical or asymmetric with respect to the central plane. In order to facilitate the mounting of the battery cell 1', the guide structure 212' extends toward the two sides to such a length that it does not exceed beyond the plane formed by the second direction x and the third direction y.

Such a guide structure 212' can not only guide the movement of the battery cell 1', but also provide a supporting effect at the bottom of the battery cell 1', so that the battery cell 1' can be more stably placed on the guide structure 212' during the mounting process. Moreover, if the guide structure 212' is located at the bottom of the corresponding battery cell 1' when the battery module 10 is in use, the supporting effect of the guide structure 212' on the battery cell 1' can reduce the stress on the battery cell 1' to prevent deformation of the battery cell 1', thereby improving the reliability and service life of the battery module 10.

In this embodiment of the present application, a plurality of guide structures 212' are provided for each guide portion 212, and the plurality of guide structures 212' can respectively provide a guiding effect to the plurality of corresponding battery cells 1', so that the plurality of battery cells 1' of each battery unit 1 can be each independently and stably guided to prevent mutual interference between adjacent battery cells 1', thereby reducing the difficulty of assembling the battery module 10.

In some embodiments, as shown in FIG. 5, adjacent guide structures 212' of the same guide portion 212 are connected to each other. For example, a chamfered or rounded corner may be provided at the joint between the adjacent guide structures 212' to prevent the battery cells 1' from being scratched during assembly and reduce the stress concentration at the joint.

In this embodiment of the present application, the adjacent guide structures 212' of the same guide portion 212 are connected to each other, so that the overall rigidity of the guide portion 212 and the overall rigidity of the holder 2 can be increased, so as to prevent the deformation of the guide portion 212 during the storage and transfer of the holder 2, ensuring the smooth assembly of the battery cells 1'. Moreover, during the long-term use of the battery module 10, the deformation of the guide portion 212 due to vibration or impact can also be prevented, so as to ensure that the guide portion 212 provides a stable support for the battery unit 1, and to improve the reliability and the service life of the battery module 10. Optionally, adjacent guide structures 212' of the same guide portion 212 may also be independent from each other.

In some embodiments, as shown in FIGS. 4 and 5, the battery module 10 further includes a thermal management component 3 arranged between two adjacent battery units 1, the one of the plurality of guide portions 212 having the longest extension length is defined as a first guide portion 212; and the guide structures 212' of each guide portion 212, except the first guide portion 212, are provided with notches 212A. The notches 212A are configured to be clear of the thermal management component 3.

From a functional point of view, the thermal management component 3 is configured to accommodate a fluid to regulate the temperature of the plurality of battery cells 1'. The fluid here may be liquid or gas, and temperature regulation means heating or cooling the plurality of battery cells. In the case of cooling or reducing the temperature of the battery cells 1', the thermal management component 3 is configured to accommodate a cooling fluid to reduce the temperature of the plurality of battery cells. In this case, the thermal management component 3 may also be called a cooling component, a cooling system or a cooling plate, etc. The fluid accommodated by the thermal management component may also be called a cooling medium or a cooling fluid, and more specifically, may be called a cooling liquid or a cooling gas. In addition, the thermal management component 3 may also be used for heating to raise the temperature of the plurality of battery cells, which will not be limited by the embodiments of the present application. Optionally, the fluid may flow in a circulating manner to achieve a better temperature regulation effect. Optionally, the fluid may be water, a mixture of water and ethylene glycol, or air, etc.

From a structural point of view, the thermal management component 3 may be a plate-like or block-like structure covering the adjacent battery unit 1 as a whole, or may be a plurality of discrete plate-like or block-like structures, or the like. For example, the battery cell 1' is a cylindrical battery cell, and the thermal management component 3 may be of a flat plate structure or a corrugated plate-like structure with each arched portion accommodating a battery cell 1'. Such a corrugated plate-like structure can provide an auxiliary positioning effect on the adjacent battery unit 1, can improve the cooling effect on the battery unit 1 by increasing the contact area with the battery unit 1, and can improve the reliability of fixing with the battery unit 1.

In order to enable the thermal management component 3 to have a better temperature regulation effect on the end of the battery unit 1 in the third direction y, the extension length of the thermal management component 3 in the third direction y will be increased as much as possible, for example, extending beyond the guide portion 212. By providing a notch 212A on each guide structure 212', a space can be reserved for the extension of the thermal management component 3. For example, the notch 212A may be a rectangular opening, a circular opening, or an opening in another shape.

In this embodiment of the present application, by providing a notch 212A on each guide structure 212', the guide structure can be clear of the thermal management component 3, so as to leave a space for the thermal management component 3 to extend beyond the guide structure 212' in the third direction y, thereby providing a better temperature regulation effect for the battery cells 1', and improving the operation performance of the battery module 10.

In some embodiments, as shown in FIG. 5, the holder 2 is provided with a clearance channel 23 corresponding to each guide portion 212. The clearance channel 23 is configured to allow the battery unit 1 to be mounted to the guide portion 212 in the first direction z.

Each guide portion 212 includes a plurality of guide structures 212'. For example, the guide structure 212' extends along a part of the circumference of the corresponding battery cell 1' to form an opening at the position where the battery cell 1' is mounted in the first direction z. The openings of the plurality of guide structures 212' of each guide portion 212 form the clearance channel 23 as a whole.

As shown in FIG. 5, the one of the plurality of guide portions 212 having the longest extension length is defined as a first guide portion 212, and the first guide portion 212 is located at the bottom. The clearance channel 23 of each guide portion 212 is located above the guide portion 212, so that the corresponding battery unit 1 is mounted to the guide portion 212 from top to bottom.

In this embodiment of the present application, by correspondingly providing a clearance channel 23 for each guide portion 212, the battery unit 1 can be smoothly mounted in the first direction z to the position where the corresponding guide portion 212 is located. Moreover, after being mounted in place in the first direction z, the battery unit 1 can also be supported by the guide portion 212, so that the battery unit 1 is in a stable placement state, facilitating the subsequent mounting of the next battery unit 1 by bringing the two holders 2 close to each other.

In some embodiments, as shown in FIG. 5, a plurality of accommodating grooves 211 are provided on the side of the main body portion 21 close to the plurality of battery units 1, the accommodating grooves 211 are arranged corresponding to the battery cells 1', and the accommodating grooves 211 are configured to accommodate part of the battery cells 1'.

The shape of the accommodating groove 211 is adapted to the shape of an end of the battery cell 1', so as to position the battery cell 1' after the battery cell 1' is mounted in place. For example, if the battery cell 1' is cylindrical, the accommodating groove 211 is a circular hole into which the end of the battery cell 1' is inserted.

In this embodiment of the present application, by providing the main body portion 21 with accommodating grooves 211 for accommodating the battery cells 1' so as to position the battery cells 1' in the plane where the second direction x and the first direction y are located, the battery cells 1' can be brought into a more stable mounted state after the assembly is completed, so that the battery cells 1' are fixed reliably.

In some embodiments, as shown in FIG. 5, each guide portion 212 includes a plurality of guide structures 212'. The plurality of guide structures 212' are arranged corresponding to the plurality of corresponding battery cells 1' on a one-to-one basis. The guide structure 212' is arranged at an end of the accommodating groove 211 in the third direction y.

Specifically, the guide structure 212' is provided at the end of the accommodating groove 211 close to the battery cell 1', and the surface of the guide structure 212' that is configured to provide guidance for the movement of the battery cell 1' is tangent to an inner side wall of the accommodating groove 211. When mounting a plurality of battery cells 1' of one battery unit 1, the battery cells 1' are first placed on the guide structures 212', and as the two holders 2 are brought close to each other, the battery cells 1' are gradually moved until the ends enter the accommodating grooves 211.

In this embodiment of the present application, the guide structure 212' is arranged at an end of the accommodating groove 211 in the third direction y, so that the battery cell 1' can be stably and smoothly enter the accommodating groove 211 through the guiding effect of the guide structure 212' on the battery cell 1' during assembly in the process of bringing the two holders 2 close to each other, so that the layered mounting of the plurality of battery units 1 can be smoothly realized, and the assembly efficiency can be improved.

Figure 6:
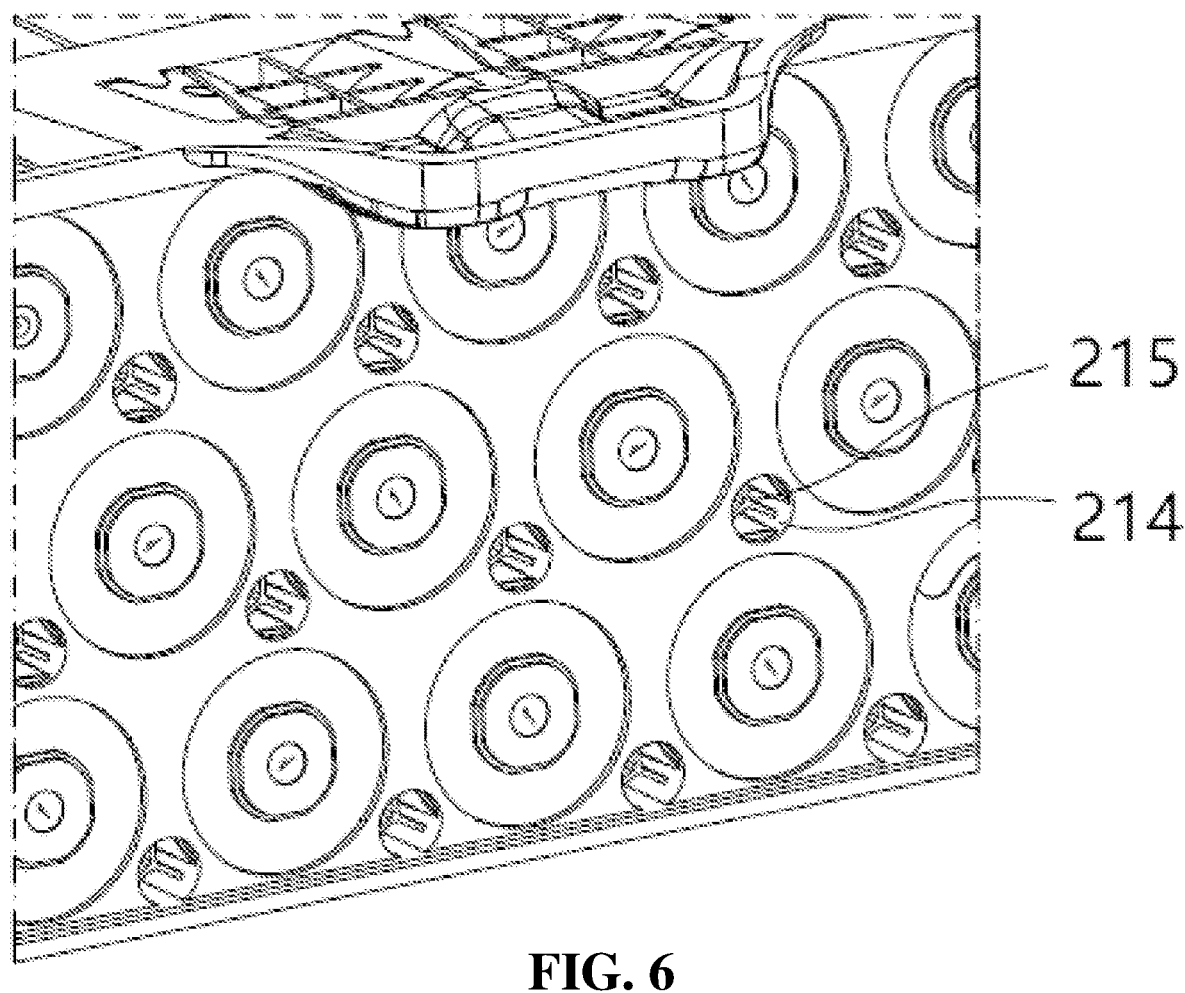
FIG. 6 is a partial enlarged view of the side of a holder close to a battery unit.

In some embodiments, as shown in FIG. 6, a protrusion 213 is formed on an inner wall of the accommodating groove 211. The protrusion 213 is configured to restrain the movement of the battery cell 1' in the third direction y. The protrusion 213 may be arranged at the end of the accommodating groove 211 away from the battery unit 1 in the third direction y, and the protrusion 213 may be in the shape of a ring or a plate.

In this embodiment of the present application, by providing protrusions 213 on the accommodating grooves 211 of the two holders 2, the movement of the battery cells 1' in the third direction y can be restrained, and the battery cells 1' can be prevented from playing in the third direction y due to vibration and impact during operation, so that the battery cells 1' are mounted more reliably.

Figure 7:
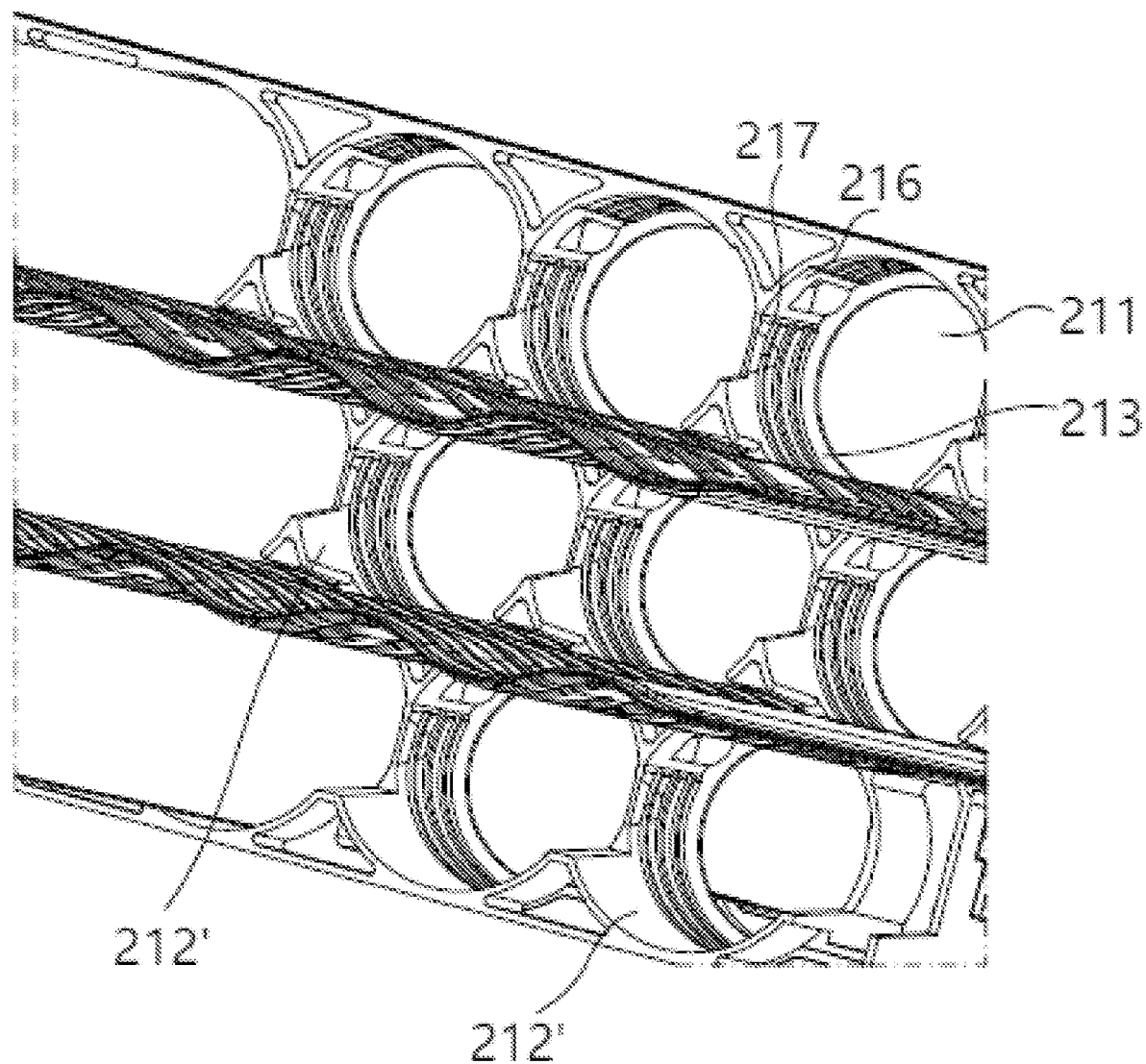
FIG. 7 is a partial enlarged view of the side of the holder away from the battery unit.

In some embodiments, as shown in FIG. 7, the holder 2 is provided with a plurality of injection holes 214 on an outer side in the third direction y. The injection holes are configured to form channels for injecting an adhesive, and each of the accommodating grooves 211 is in communication with at least some of the injection holes 214.

Specifically, the injection hole 214 may be provided in a blank area between adjacent battery cells 1', and the injection hole 214 may be a circular hole, a polygonal hole or any other hole in any shape. For example, the adhesive may be glue or other viscous liquid, which is configured to be injected into the accommodating grooves 211 through the injection holes 214, and be filled in between inner surfaces of the accommodating grooves 211 and outer surfaces of the battery cell 1', so as to realize the fixing of the battery cells 1' in the accommodating grooves 211.

As shown in FIG. 6, the bottom of the injection hole 214 is provided with a first guide groove 215, which is configured to guide the adhesive from the injection hole 214 into the accommodating groove 211. One or a plurality of first guide grooves 215 may be provided. When a plurality of first guide grooves 215 are provided, the plurality of first guide grooves 215 may respectively guide the adhesive layer into different accommodating grooves 211.

For example, the plurality of battery cells 1' of adjacent battery units 1 are staggered in the second direction x, the holder 2 is provided with a plurality of injection holes 214, each injection hole 214 is provided in the area between three accommodating grooves 211 arranged in a triangle, and the bottom of the injection hole 214 is provided with three first guide grooves 215 at intervals in the circumferential direction, so as to guide the adhesive layer into the three accommodating grooves 211 respectively. In such an arrangement, each accommodating groove 211 can be injected with the adhesive layer through three injection holes 214 at the same time, so that the adhesive layer can be uniformly distributed in the accommodating groove 211 in the circumferential direction, and the reliability of fixing the battery cell 1' in the accommodating groove 211 is improved.

As shown in FIG. 7, one or more storage grooves 216 are provided on a side wall of the accommodating groove 211, and the storage groove 216 is in communication with the injection hole 214. For example, the storage groove 216 may be arranged at a position corresponding to the injection hole 214. In addition, a second guide groove 217 is provided on the side wall of the accommodating groove 211. The second guide groove 217 is in communication with the storage groove 216, extends along a part of the accommodating groove 211 at least partially in the circumferential direction, and is configured to guide the adhesive layer from the storage groove 216 to a different position in the circumferential direction of the battery cell 1'. When the matching gap between the battery cell 1' and the accommodating groove 211 is small, the battery cell 1' can also be fixed by means of the adhesive layer in the second guide groove 217.

Specifically, three storage grooves 216 are uniformly arranged on the side wall of the accommodating groove 211 in the circumferential direction, and each two adjacent storage grooves 216 are in communication with each other through a second guide groove 217, facilitating the mutual circulation of the adhesive layer in the plurality of storage grooves 216, so that the adhesive layer can flow and fill, so as to ensure the effective fixation of the battery cells 1'. In order to improve the uniformity of filling of the adhesive layer, two, three or more second guide grooves 217 may be arranged between adjacent storage grooves 216 at intervals in the third direction y.

As shown in FIG. 7, one or more storage grooves 216 are provided on a side wall of the accommodating groove 211, and the storage groove 216 is in communication with the injection hole 214. For example, the storage groove 216 may be arranged at a position corresponding to the injection hole 214. In addition, a guide groove 217 is provided on the side wall of the accommodating groove 211. The guide groove 217 is in communication with the storage groove 216, extends along a part of the accommodating groove 211 at least partially in the circumferential direction, and is configured to guide the adhesive layer from the storage groove 216 to a different position in the circumferential direction of the battery cell 1'. When the matching gap between the battery cell 1' and the accommodating groove 211 is small, the battery cell 1' can also be fixed by means of the adhesive layer in the guide groove 217.

Specifically, three storage grooves 216 are uniformly arranged on the side wall of the accommodating groove 211 in the circumferential direction, and each two adjacent storage grooves 216 are in communication with each other through a guide groove 217, facilitating the mutual circulation of the adhesive layer in the plurality of storage grooves 216, so that the adhesive layer can flow and fill, so as to ensure the effective fixation of the battery cells 1'. In order to improve the uniformity of filling of the adhesive layer, two, three or more guide grooves 217 may be arranged between adjacent storage grooves 216 at intervals in the third direction y.

In this embodiment of the present application, injection holes 214 are provided on an outer side of the holder 2, and an adhesive layer can be injected after the mounting of some of the battery units 1 is completed, or after the mounting of all the battery units 1 is completed, so that the adhesive layer is filled in between inner surfaces of the accommodating grooves 211 and outer surfaces of the battery cells 1', and the battery cells 1' can be reliably fixed in the accommodating grooves 211.

In some embodiments, the battery module 10 further includes a thermal management component 3 arranged between two adjacent battery units 1. An end of the thermal management component 3 in the third direction y abuts against the adjacent guide portion 212 in the first direction z, to restrain the thermal management component 3 and the battery unit 1 adjacent to the thermal management component 3 from being disengaged outwardly in the first direction z by means of the guide portion 212.

The structure of the thermal management component 3 has been described in the previous embodiments, and will not be repeated here. In this embodiment, in the first direction z, there is a gap between the battery unit 1 and the guide portion 212, and an end of the thermal management component 3 in the third direction y extends into the gap, and abuts against the adjacent guide portion 212 in the first direction z. A surface of the thermal management component 3 in the first direction z is coated with an adhesive layer, so as to be fixed to the adjacent battery unit 1. Optionally, one surface of the thermal management component 3 may be provided with positioning posts 31 configured to position the adjacent thermal management component 3.

In this embodiment of the present application, the guide portion 212 restrains the thermal management component 3 and the battery cells 1' adjacent to the thermal management component 3 from being disengaged outwardly in the first direction z, so as to limit the freedom of the thermal management component 3 and the adjacent battery unit 1 in the first direction z, so that not only can the thermal management component 3 and the battery unit 1 that have been mounted be prevented from shaking during assembly, but also the overall rigidity of the battery module 10 can be increased. The thermal management component 3 and the battery unit 1 are prevented from shaking under the action of vibration and impact during the use of the battery module 10.

The structure of the battery module 10 of the present application will be described in detail below with reference to FIGS. 3 to 7.

As shown in FIGS. 3 and 4, the battery module 10 includes two holders 2 and a plurality of battery units 1. The two holders 2 are arranged at an interval in the third direction y. Three battery units 1 are provided in the figures, and two or more than three battery units may also be provided as required. Each battery unit 1 includes a plurality of battery cells 1' arranged in the second direction x. For example, the battery cells 1' are cylindrical. A plurality of accommodating grooves 211 are provided on the side wall of the holder 2 facing the battery unit 1, and the plurality of accommodating grooves 211 are arranged corresponding to all the battery cells 1' of the plurality of battery units 1 on a one-to-one basis.

As shown in FIG. 5, each battery unit 1 is provided with a corresponding guide portion 212, and the guide portions 212 corresponding to the plurality of battery units 1 gradually decrease in the first direction z. Each guide portion 212 includes a plurality of guide structures 212'. The plurality of guide structures 212' are arranged corresponding to the plurality of corresponding battery cells 1' on a one-to-one basis.

As shown in FIG. 5, the guide structure 212' is provided at the end of the accommodating groove 211 facing the battery cell 1', and extends in the direction of the battery cell 1'. The surface of the guide structure 212' for providing guidance may be arc-shaped, and is adapted to the battery cell 1'. Adjacent guide structures 212' of the same guide portion 212 are connected to each other. The guide structure 212' having the largest extension length extends continuously in the circumferential direction of part of the battery cell 1' and is located at the bottom of the battery cell 1'. The second and higher guide structures 212' are provided with notches 212A so as to be clear of the thermal management component 3 located between adjacent battery units 1. The top area of the guide structure 212' forms a clearance channel 23, so that the battery cell 1' is mounted to the guide structure 212' from top to bottom in the first direction z.

Figure 9:
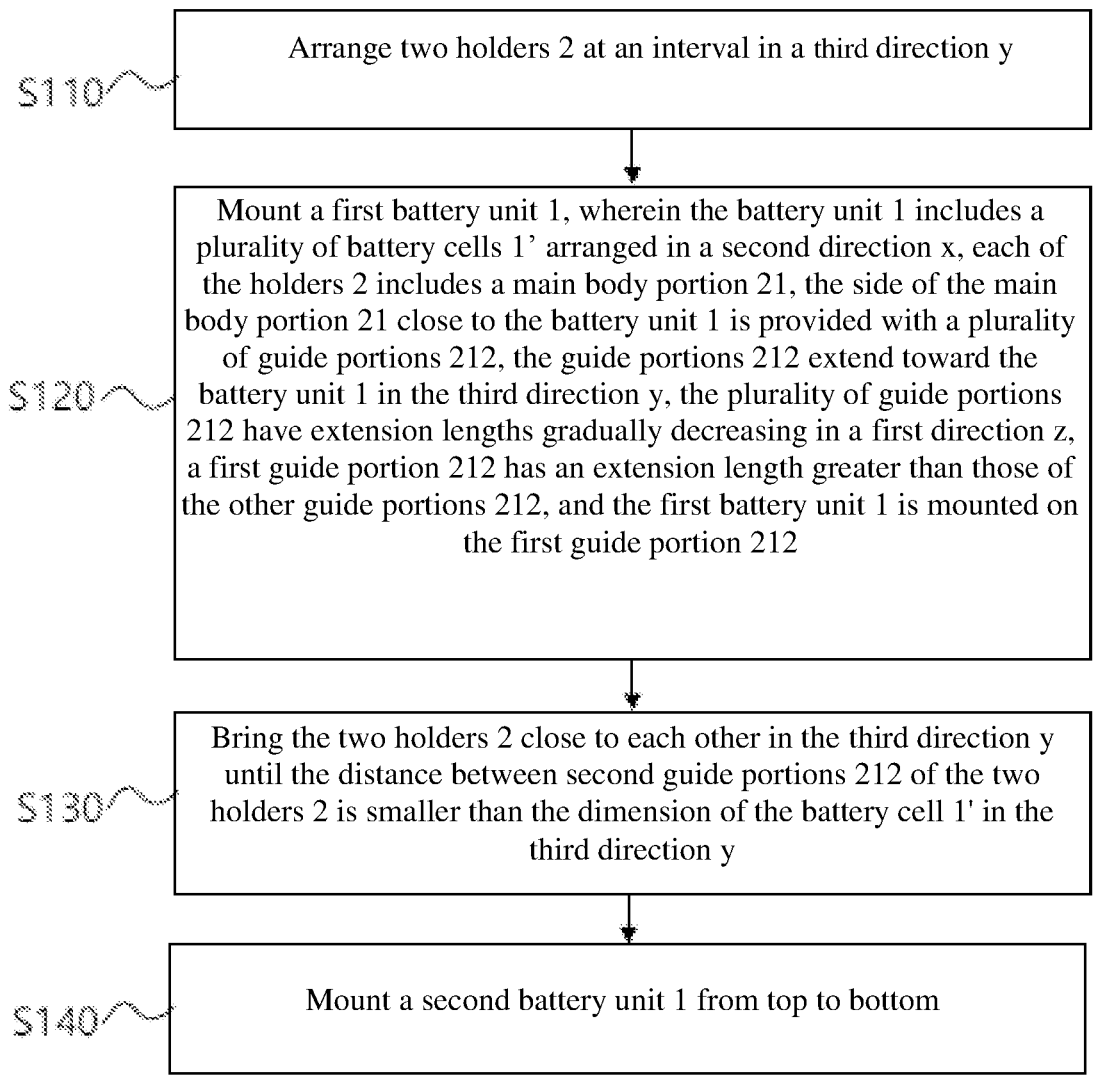
FIG. 9 is a schematic flowchart of some embodiments of a method for assembling a battery of the present application.

Next, the present application provides a method for assembling a battery module 10. In some embodiments, as shown in FIG. 9, the assembling method includes:

S110: arranging two holders 2 at an interval in a third direction y;

S120: mounting a first battery unit 1, wherein the battery unit 1 includes a plurality of battery cells 1' arranged in a second direction x, each of the holders 2 includes a main body portion 21, the side of the main body portion 21 close to the battery unit 1 is provided with a plurality of guide portions 212, the guide portions 212 extend toward the battery unit 1 in the third direction y, the plurality of guide portions 212 have extension lengths gradually decreasing in a first direction z, a first guide portion 212 has an extension length greater than those of the other guide portions 212, and the first battery unit 1 is mounted on the first guide portion 212;

S130: bringing the two holders 2 close to each other in the third direction y until the distance between second guide portions 212 of the two holders 2 is smaller than the dimension of the battery cell 1' in the third direction y; and S140: mounting a second battery unit 1 from top to bottom.

S110 to S140 are executed sequentially. If the battery module 10 includes more than two battery units 1, S130 and S140 may be repeatedly executed to sequentially mount the battery units 1 higher than the second battery unit between the two holders 2. After all the battery units 1 are mounted, the two holders 2 continue to be brought close to each other in the third direction y until all the battery units 1 are limited in the third direction y by means of the protrusions 213 in FIG. 7.

In this embodiment of the present application, the layered mounting of the plurality of battery units 1 can be realized, and there is no need to align all the battery cells 1' of the plurality of battery units 1 with the mounting positions on the holder 2 at the same time, so that even if the number of battery cells 1' is large, the battery cells can be easily mounted, the influence, caused by the tolerances of parts, on the assembly of the battery cells 1' can be reduced, and therefore the difficulty of assembling the battery module 10 can be reduced, thereby improving the assembly efficiency.

In some embodiments, the assembling method of the present application further includes:

after the first battery unit 1 is mounted, mounting a thermal management component 3 coated with an adhesive on an upper surface of the first battery unit 1 such that the thermal management component 3 is fixed to the first battery unit 1.

Specifically, after the thermal management component 3 is fixed on the first battery unit 1, the second battery unit 1 is then mounted, and a thermal management component 3 is fixed on the second battery unit 1, and so on. The thermal management component 3 may be coated with an adhesive layer so as to be fixed to the adjacent battery cells 1'.

In this embodiment of the present application, by fixing a thermal management component 3 on the mounted battery unit 1, not only can the mounted battery unit 1 be fixed during assembly to facilitate the mounting of a subsequent battery unit 1, but also the position of the battery unit 1 can be maintained during the use of the battery module 10, the anti-vibration and impact ability is enhanced, and thermal regulation is provided for the adjacent battery unit 1, so that the performance of the battery module 10 remains stable.

In some embodiments, a plurality of accommodating grooves 211 are provided on the side of the main body portion 21 close to the battery unit 1, the accommodating grooves 211 are arranged corresponding to the battery cells 1', and the accommodating grooves 211 are configured to accommodate the battery cells 1'; and the assembling method further includes:

injecting an adhesive from injection holes 214 on an outer side of the holder 2 to form an adhesive layer between the battery cells 1' and the accommodating grooves 211.

In this embodiment of the present application, an adhesive layer is injected after the mounting of some of the battery units 1 is completed, or after the mounting of all the battery units 1 is completed, so that the adhesive layer is filled in between inner surfaces of the accommodating grooves 211 and outer surfaces of the battery cells 1', and the battery cells 1' can be reliably fixed in the accommodating grooves 211.

The assembling method of the present application will be specifically described below with reference to FIGS. 8A to 8F.

Figure 8A:
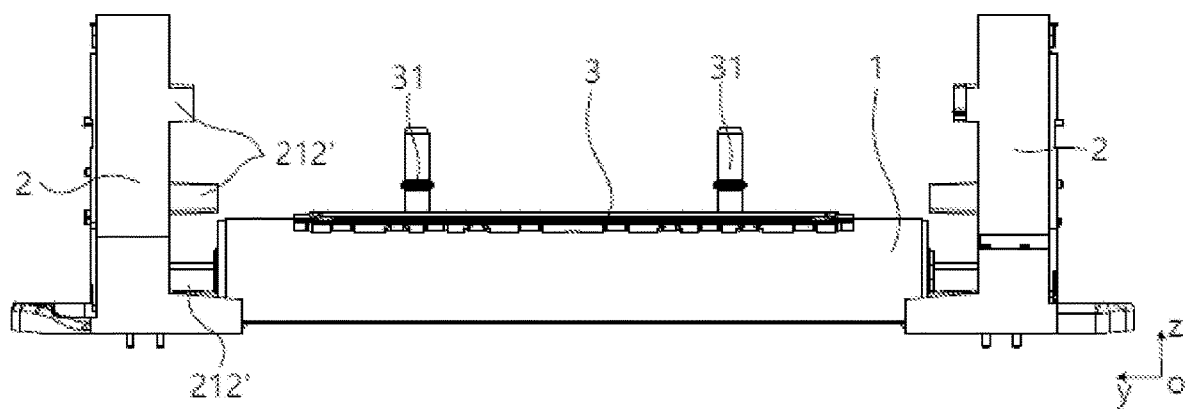
FIG. 8A is a schematic diagram of mounting a first battery unit and mounting a thermal management component thereon.

1. As shown in FIG. 8A, two holders 2 are arranged at an interval in the third direction y; and from the bottom, the first guide portion 212 has the longest extension length, and the plurality of guide portions 212 have the extension length gradually decreasing from bottom to top.

At this time, the distance between the respective first guide portions 212 of the two holders 2 is smaller than the dimension of the battery cell 1' in the third direction y, and the distance between the respective second guide portions 212 of the two holders 2 is not less than the dimension of the battery cell 1' in the third direction y, the first battery unit 1 is placed on the first guide portion 212 from top to bottom. Then, a thermal management component 3 with an adhesive layer is mounted on the first guide portion 212, and positioning posts 31 of the thermal management component 3 are arranged upward.

Figure 8B:
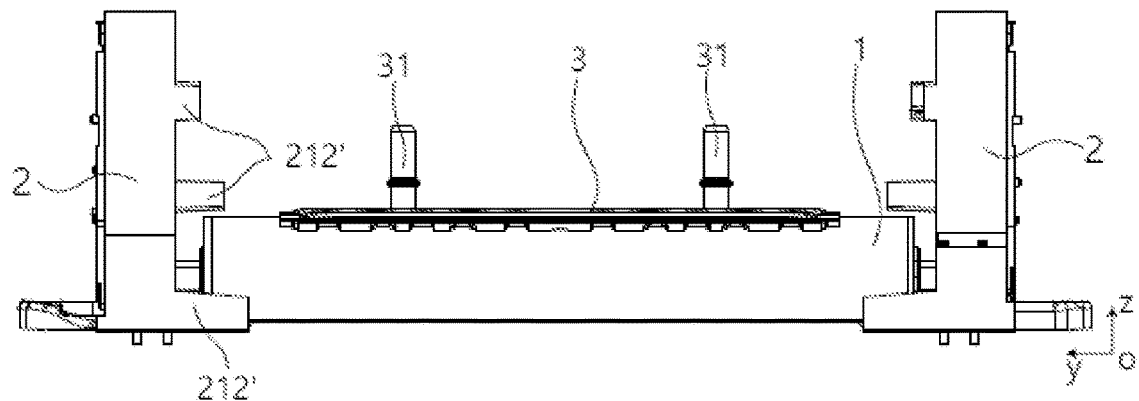
FIG. 8B is a schematic diagram of bringing two holders close to each other to press the first battery unit by means of guide portions.

2. As shown in FIG. 8B, the two holders 2 are brought close to each other in the third direction y until the distance between the respective second guide portions 212 of the two holders 2 is smaller than the dimension of the battery cell 1' in the third direction y, and the distance between the respective third guide portions 212 of the two holders 2 is greater than the dimension of the battery cell 1' in the third direction y. At this time, the first battery unit 1 is limited in the first direction z.

Figure 8C:
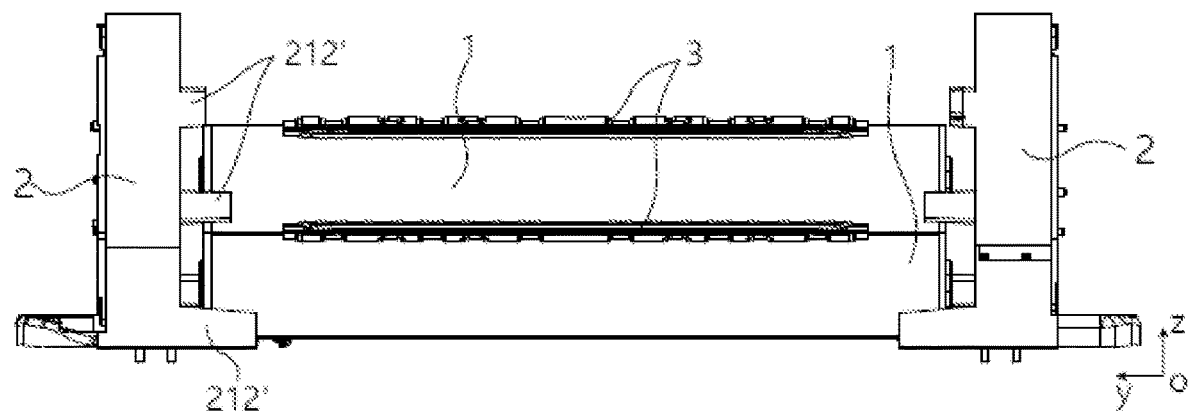
FIG. 8C is a schematic diagram of mounting a second battery unit and mounting a thermal management component thereon.

3. As shown in FIG. 8C, a second battery unit 1 is placed on the second guide portion 212 from top to bottom, and a thermal management component 3 with an adhesive layer is mounted on the second guide portion 212.

Figure 8D:
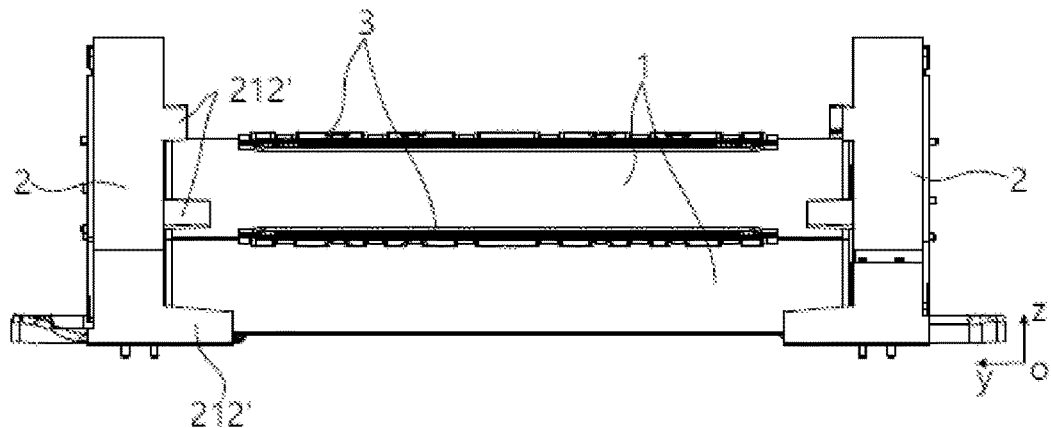
FIG. 8D is a schematic diagram of bringing two holders close to each other to press the second battery unit by means of guide portions.

4. As shown in FIG. 8D, the two holders 2 are brought close to each other in the third direction y until the distance between the respective third guide portions 212 of the two holders 2 is smaller than the dimension of the battery cell 1' in the third direction y. At this time, the second battery unit 1 is limited in the first direction z.

Figure 8E:
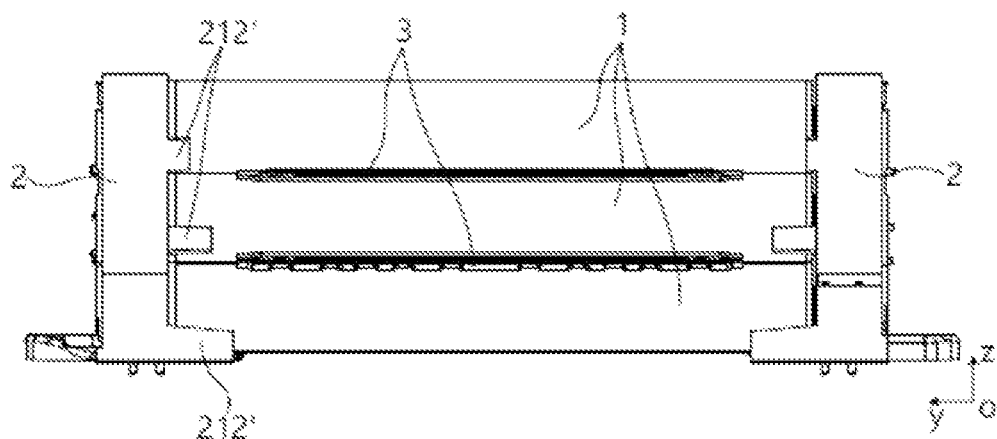
FIG. 8E is a schematic diagram of mounting a third battery unit.

5. As shown in FIG. 8E, a third battery unit 1 is placed on the third guide portion 212 from top to bottom.

Figure 8F:
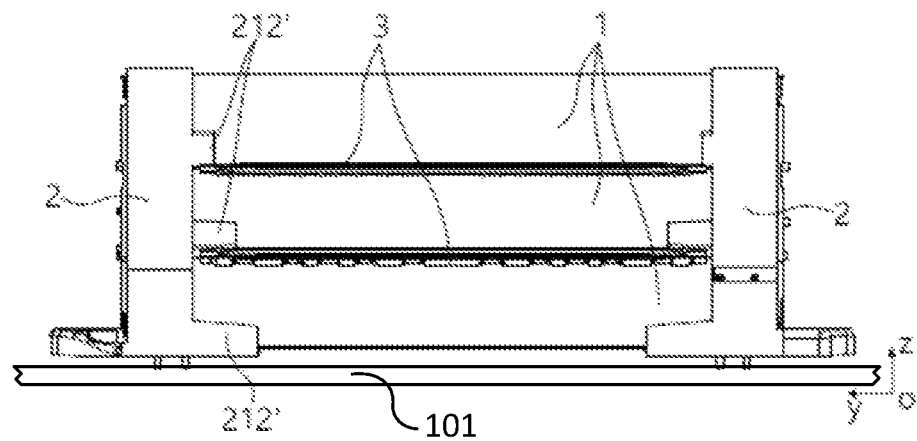
FIG. 8F is a schematic diagram of bringing two holders close to each other to form a battery module after the three battery units are all mounted.

6. As shown in FIG. 8F, the two holders 2 continue to be brought close to each other in the third direction y until protrusions 213 on inner side walls of accommodating grooves 211 on the two holders 2 restrain the movement of the battery cells 1' in the third direction y. So far, all the battery cells 1' are mounted to the holders 2, and the adhesive layer can be injected between the battery cells 1' and the accommodating grooves 211 from the injection holes 214 on the outer side of the holder 2 to fix the battery cells 1'.

Figure 10:
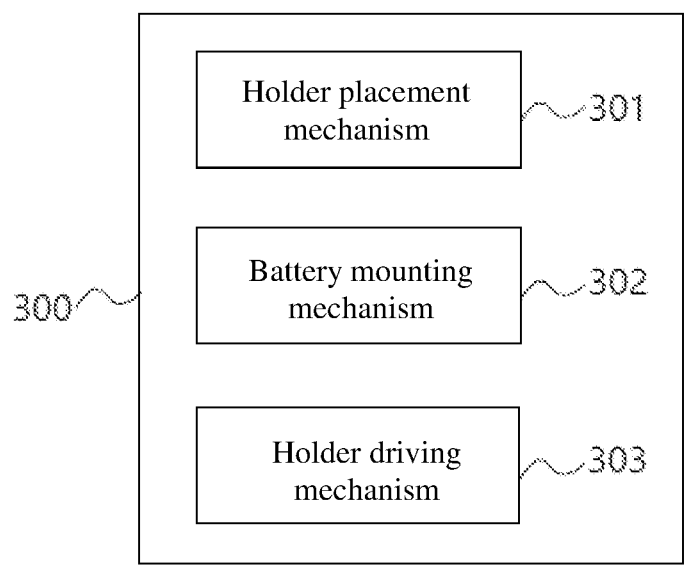
FIG. 10 is a schematic structural diagram of constituent modules of some embodiments of a device for assembling a battery of the present application.

Finally, the present application also provides a device 300 for assembling a battery module 10. In some embodiments, as shown in FIG. 10, the assembling device 300 includes a holder placement mechanism 301, a battery mounting mechanism 302 and a holder driving mechanism 303.

The holder placement mechanism 301 is configured to arrange two holders 2 at an interval in a third direction y.

The battery mounting mechanism 302 is configured to mount a first battery unit 1. The battery unit 1 includes a plurality of battery cells 1' arranged in a second direction x, each of the holders 2 includes a main body portion 21, the side of the main body portion 21 close to the battery unit 1 is provided with a plurality of guide portions 212, the guide portions 212 extend toward the battery unit 1 in the third direction y, the plurality of guide portions 212 have extension lengths gradually decreasing in a first direction z, a first guide portion 212 has an extension length greater than those of the other guide portions 212, and the first battery unit 1 is mounted on the first guide portion 212. For example, the battery mounting mechanism 302 may be a manipulator or the like.

The holder driving mechanism 303 is configured to bring the two holders 2 close to each other in the third direction y until the distance between second guide portions 212 of the two holders 2 is smaller than the dimension of the battery cell 1' in the third direction y.

The battery mounting mechanism 302 is configured such that when the distance between the second guide portions 212 of the two holders 2 is smaller than the dimension of the battery cell 1' in the third direction y, a second battery unit 1 is mounted from top to bottom.

In this embodiment of the present application, the layered mounting of the plurality of battery units 1 can be realized, and there is no need to align all the battery cells 1' of the plurality of battery units 1 with the mounting positions on the holder 2 at the same time, so that even if the number of battery cells 1' is large, the battery cells can be easily mounted, the influence, caused by the tolerances of parts, on the assembly of the battery cells 1' can be reduced, and therefore the difficulty of assembling the battery module 10 can be reduced, thereby improving the assembly efficiency. Moreover, automated assembly can be implemented.

While the present application has been described with reference to some embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A battery module, comprising:
    a plurality of battery units configured to be stacked in a first direction, each of the battery units comprising a plurality of battery cells arranged in a second direction, the second direction being perpendicular to the first direction; and
    two holders respectively located at two ends of the plurality of battery units in a third direction, the third direction being perpendicular to the second direction and the first direction;
    wherein:
        each of the two holders comprises a main body portion;
        a plurality of guide portions are provided on a side of the main body portion close to the plurality of battery units;
        the plurality of guide portions are arranged corresponding to the plurality of battery units on a one-to-one basis;
        the plurality of guide portions extend toward the plurality of battery units in the third direction, and each of the plurality of guide portions is configured to provide guidance for movement of a corresponding one of the battery units; and
        extension lengths of the plurality of guide portions extending in the third direction gradually decrease in the first direction.

2. The battery module according to claim 1, wherein a surface of each of the guide portions that is configured to provide guidance for the movement of the corresponding one of the battery units is adapted to shapes of the battery cells of the corresponding one of the battery units.

3. The battery module according to claim 1, wherein each of the guide portions is provided with grooves in which the battery cells of the corresponding one of the battery units are accommodated.

4. The battery module according to claim 1, wherein each of the guide portions is configured to provide support for the corresponding one of the battery units.

5. The battery module according to claim 1, wherein each of the guide portions, except one of the guide portions having a longest extension length, is arranged between two adjacent battery units of the battery units, is in contact with one of the two adjacent battery units, and has a gap with another of the two adjacent battery units.

6. The battery module according to claim 1, wherein each of the guide portions comprises a plurality of guide structures, the plurality of guide structures being arranged corresponding to the plurality of battery cells of a corresponding one of the battery units on a one-to-one basis.

7. The battery module according to claim 6, wherein adjacent guide structures of a same one of the guide portions are connected to each other.

8. The battery module according to claim 6, further comprising:
one or more thermal management components each arranged between two adjacent ones of the battery units;
wherein in each of the guide portions, except one of the guide portions having a longest extension length, each of the guide structures is provided with a notch configured to be clear of a corresponding one of the one or more thermal management components.

9. The battery module according to claim 1, wherein each of the two holders is provided with a plurality of clearance channels each corresponding to one of the guide portions and configured to allow a corresponding one of the battery units to be mounted to the corresponding guide portion in the first direction.

10. The battery module according to claim 1, wherein a plurality of accommodating grooves are provided on the side of the main body portion close to the plurality of battery units, and each of the accommodating grooves is arranged corresponding to one of the battery cells and configured to accommodate a part of the one of the battery cells.

11. The battery module according to claim 10, wherein each of the guide portions is arranged at an end of a corresponding one of the accommodating grooves in the third direction.

12. The battery module according to claim 10, wherein a protrusion is formed on an inner wall of each of the accommodating grooves, the protrusion being configured to restrain movement of the corresponding battery cell in the third direction.

13. The battery module according to claim 10, wherein each of the two holders is provided with a plurality of injection holes on an outer side in the third direction, the injection holes being configured to form channels for injecting an adhesive, and each of the accommodating grooves is in communication with at least some of the injection holes.

14. The battery module according to claim 1, further comprising:
one or more thermal management components each arranged between two adjacent ones of the battery units;
wherein an end of each of the one or more thermal management components in the third direction abuts against an adjacent one of the guide portions in the first direction, to restrain the thermal management component and the battery cell adjacent to the thermal management component from being disengaged outwardly in the first direction by means of the adjacent one of the guide portions.

15. A battery, comprising:
a battery module comprising:
a plurality of battery units configured to be stacked in a first direction, each of the battery units comprising a plurality of battery cells arranged in a second direction, the second direction being perpendicular to the first direction; and
two holders respectively located at two ends of the plurality of battery units in a third direction, the third direction being perpendicular to the second direction and the first direction;
wherein:
each of the two holders comprises a main body portion;
a plurality of guide portions are provided on a side of the main body portion close to the plurality of battery units;
the plurality of guide portions are arranged corresponding to the plurality of battery units on a one-to-one basis;
the plurality of guide portions extend toward the plurality of battery units in the third direction, and each of the plurality of guide portions is configured to provide guidance for movement of a corresponding one of the battery units; and
extension lengths of the plurality of guide portions extending in the third direction gradually decrease in the first direction.

16. The battery according to claim 15, further comprising:
a case;
wherein the battery module is arranged in the case, and the two holders are connected to the case.

17. An electrical apparatus, comprising the battery of claim 15, the battery being configured to supply electric energy.

18. A method for assembling the battery module according to claim 1, comprising:
arranging the two holders at an interval in the third direction;
mounting a first battery unit, wherein the first battery unit comprises the plurality of battery cells arranged in the second direction, each of the two holders comprises the main body portion, the side of the main body portion close to the first battery unit is provided with the plurality of guide portions, the plurality of guide portions extend toward the first battery unit in the third direction, the plurality of guide portions have extension lengths extending in the third direction gradually decreasing in the first direction, and the first battery unit is mounted on a first one of the plurality of guide portions having a longest extension length among the plurality of guide portions;
bringing the two holders close to each other in the third direction until a distance between second ones of the guide portions of the two holders is smaller than a dimension of one of the battery cells in the third direction; and
mounting a second battery unit from top to bottom.

19. The assembling method according to claim 18, further comprising:

after the first battery unit is mounted, mounting a thermal management component coated with an adhesive on an upper surface of the first battery unit such that the thermal management component is fixed to the first battery unit.

20. The assembling method according to claim 18, wherein a plurality of accommodating grooves are provided on the side of the main body portion close to the battery unit, the accommodating grooves are arranged corresponding to the battery cells, and the accommodating grooves are configured to accommodate the battery cells; and the assembling method further comprises:

injecting an adhesive from injection holes on an outer side of one of the two holders to form an adhesive layer between the battery cells and the accommodating grooves.

* * * * *